(12) United States Patent
Tachigi

(10) Patent No.: US 9,667,278 B2
(45) Date of Patent: May 30, 2017

(54) RADIO COMMUNICATION DEVICE AND METHOD FOR CONTROLLING THE RADIO COMMUNICATION DEVICE

(71) Applicant: JVC KENWOOD CORPORATION, Yokohama-shi, Kanagawa (JP)

(72) Inventor: Kazuomi Tachigi, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 15/015,406

(22) Filed: Feb. 4, 2016

(65) Prior Publication Data

US 2016/0269051 A1    Sep. 15, 2016

(30) Foreign Application Priority Data

Mar. 12, 2015  (JP) ................. 2015-049181

(51) Int. Cl.
*H04B 7/00*  (2006.01)
*H04B 1/00*  (2006.01)
*H04B 1/10*  (2006.01)

(52) U.S. Cl.
CPC .......... *H04B 1/006* (2013.01); *H04B 1/1027* (2013.01); *H04B 2001/1072* (2013.01)

(58) Field of Classification Search
CPC ................. H04B 1/006; H04B 1/1027; H04B 2001/1072
See application file for complete search history.

(56) References Cited

U.S. PATENT DOCUMENTS

2007/0225004 A1*  9/2007  Tang ................ H04M 3/42357
455/450

FOREIGN PATENT DOCUMENTS

JP           2004040212 A     2/2004

* cited by examiner

*Primary Examiner* — Nguyen Vo
(74) *Attorney, Agent, or Firm* — Nath, Goldberg & Meyer; Jerald L. Meyer; Stanley N. Protigal

(57) ABSTRACT

A determiner determines that the voice communication frequency of the voice band to be used by a subject station for a voice communication with a distant station is permitted to be changed to the voice communication frequency of a selected distant station, the voice communication frequency of the selected distant station being included in predetermined information disclosed by the selected distant station, when the predetermined information satisfies a predetermined condition set in the subject station. When an instruction to change the voice communication frequency to the voice communication frequency of the selected distant station is issued, a frequency change controller performs a control to change the voice communication frequency if the determiner determines that the voice communication frequency is permitted to be changed.

10 Claims, 12 Drawing Sheets

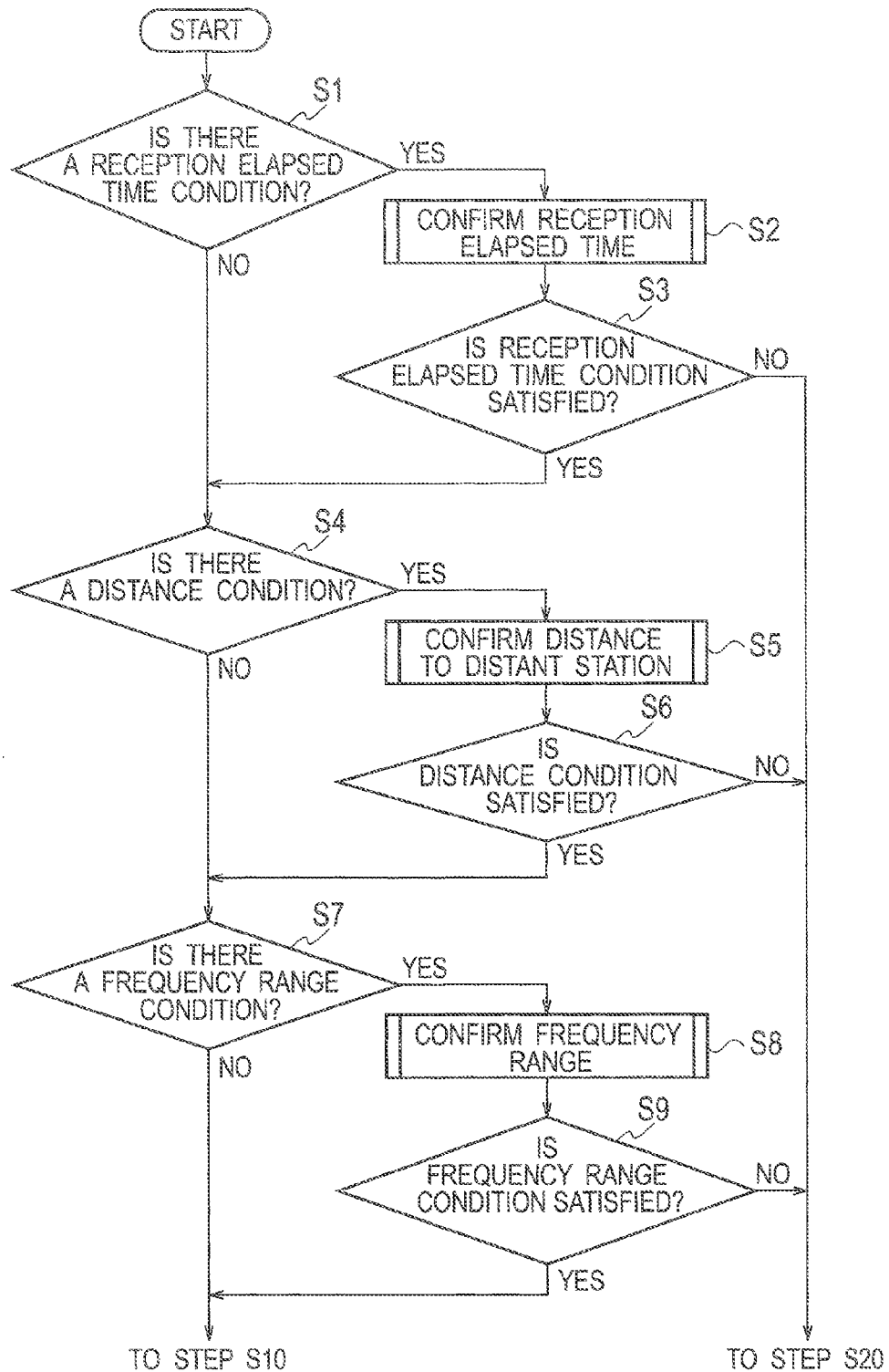

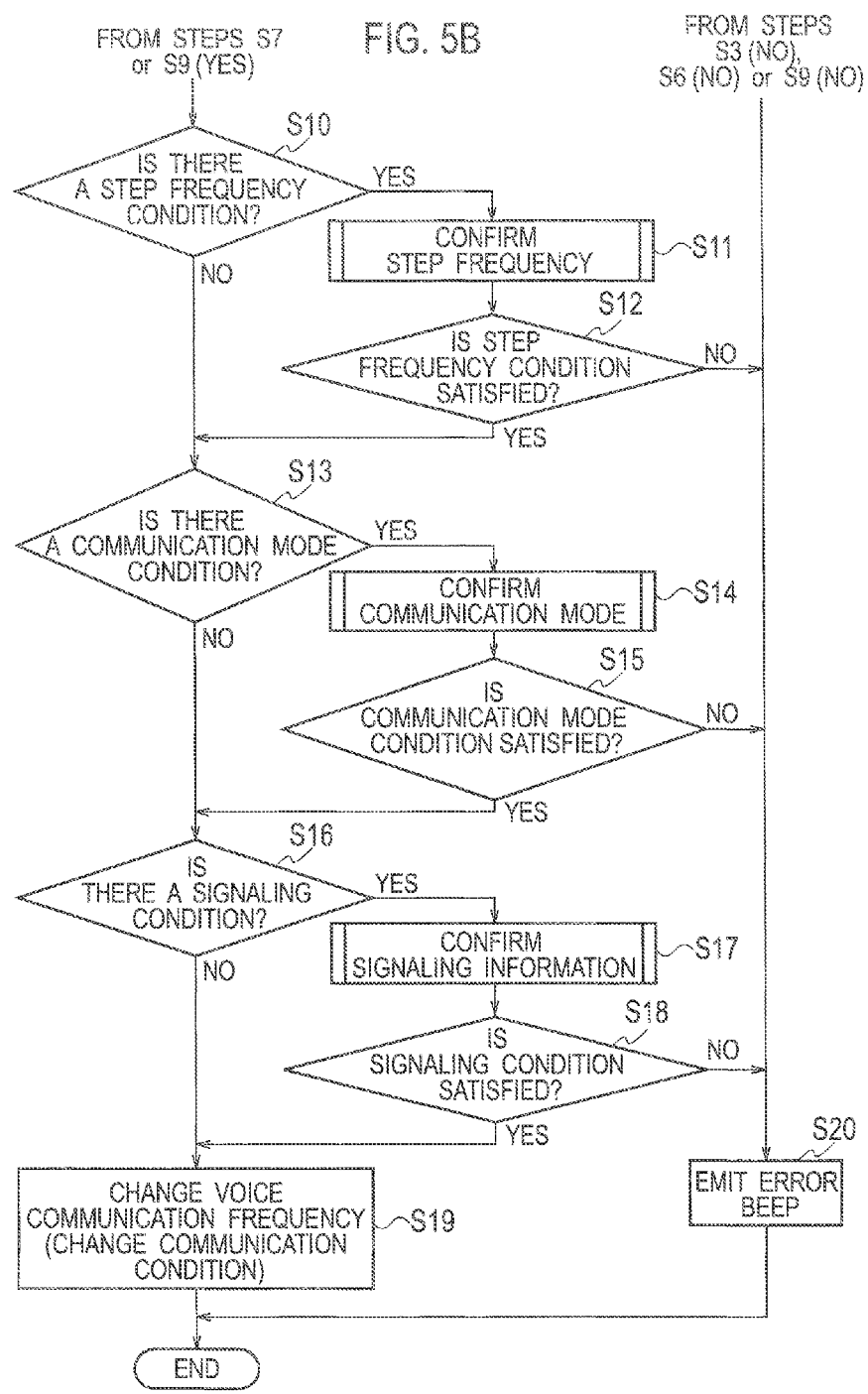

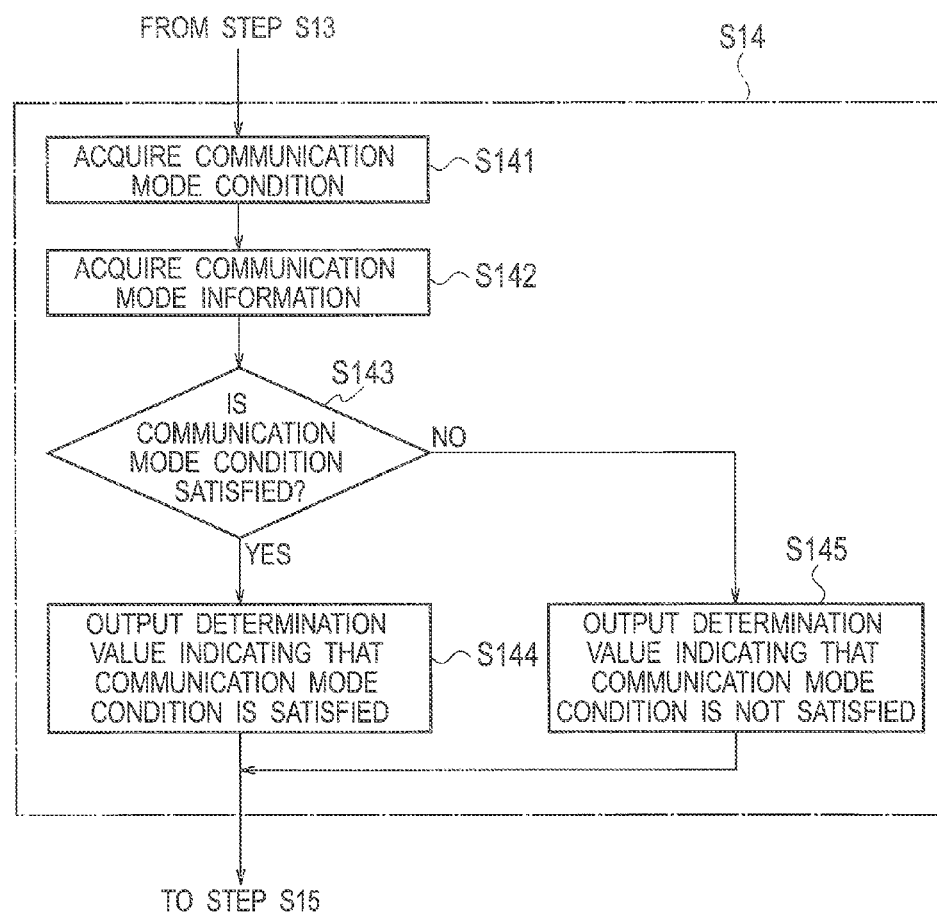

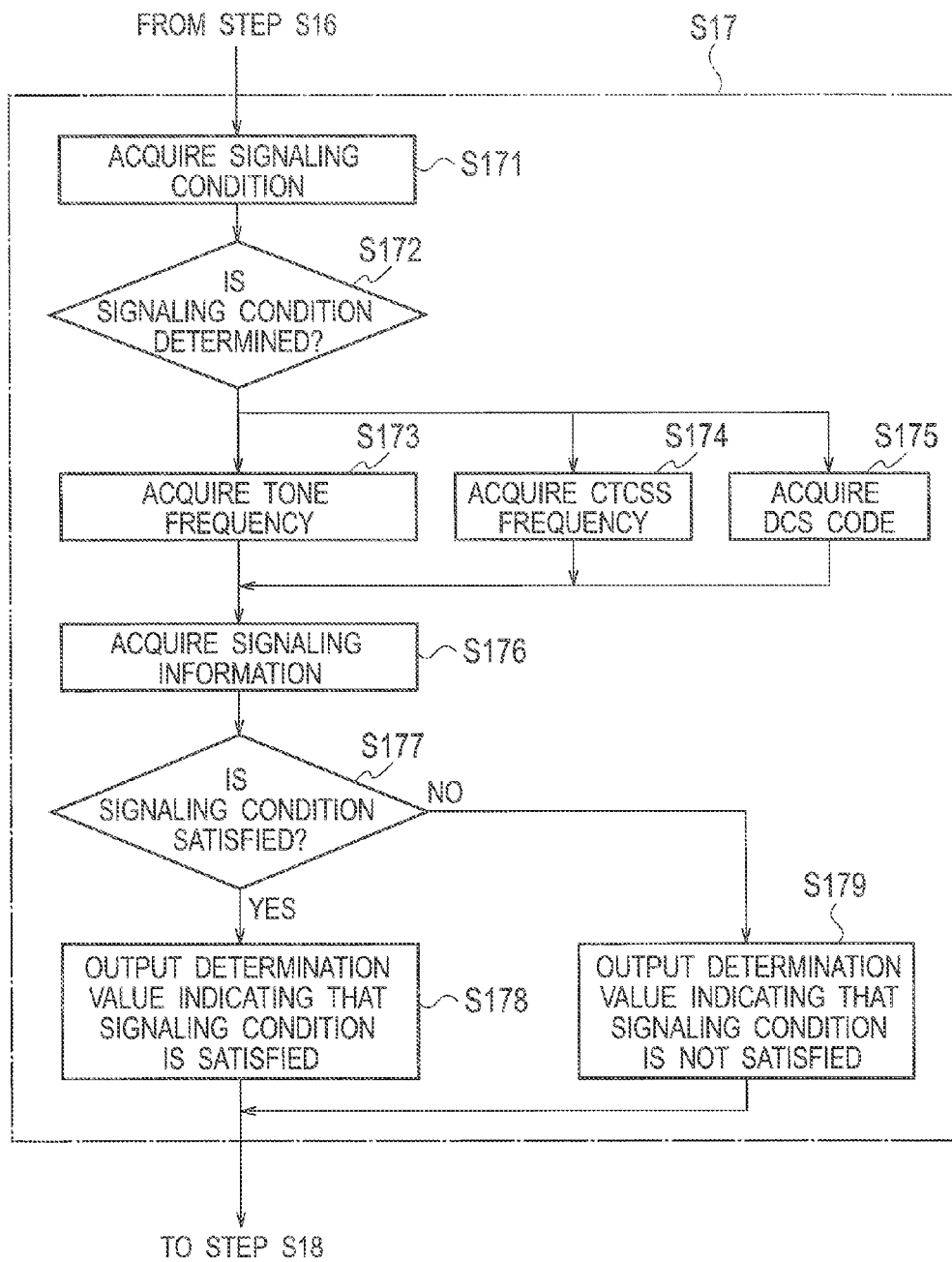

RADIO COMMUNICATION DEVICE AND METHOD FOR CONTROLLING THE RADIO COMMUNICATION DEVICE

CROSS REFERENCE TO RELATED APPLICATION

This application is based upon and claims the benefit of priority under 35 U.S.C. §119 from Japanese Patent Application No. 2015-049181, filed on Mar. 12, 2015, the entire contents of which are incorporated herein by reference.

BACKGROUND

The present disclosure relates to a radio communication device that changes the voice communication frequency of a voice band of a subject station based on frequency information of a voice band transmitted from a distant station, and relates to a method for controlling the radio communication device.

The Q-codes as three-letter abbreviations having Q as an initial letter are used internationally in radio communication. As one of the Q-codes, QSY is used in the context of changing a voice communication frequency that is in operation. A function to exchange frequency information of a voice band by using QSY is referred to as a QSY function. The voice communication frequency designated by the QSY function is referred to as a QSY frequency.

In APRS (Automatic Packet Reporting System), the QSY function to exchange the frequency information is realized by using a form of AFRS (Automatic Frequency Reporting System), which is included in communication protocol for APRS.

A distant station having the QSY function embeds the frequency information of the voice band in a position beacon, and transmits the frequency information. By using the QSY function, a subject station and the distant station can also exchange a communication mode such as FM wide/narrow, signaling information, and information on a shift direction and an offset width as well as the QSY frequency. These pieces of the information including the QSY frequency are referred to as QSY information.

SUMMARY

A radio communication device displays a station list on a display, and can thereby confirm information regarding the distant station, which is received by an APRS data communication. A user can confirm a call sign of the distant station, reception date and time and the QSY frequency by the station list.

The user can select any of the distant stations displayed on the station list, and can change and tune the voice communication frequency of a subject station voice band, which serves for a voice communication, to a QSY frequency of the selected distant station.

However, even when the subject station voice communication frequency is tuned to the QSY frequency of the selected distant station, it is unknown whether or not a voice can be actually transmitted or received. As an example, the voice sometimes cannot be transmitted or received if the distance between the subject station and the distant station is longer than a predetermined distance. Even in a state where the voice cannot be transmitted or received, the voice communication frequency is changed, and accordingly, a difficulty in returning the changed voice communication frequency to the original voice communication frequency will occur.

As described above, in a conventional radio communication device, even in such a case where the predetermined condition under which the voice can be transmitted or received is not satisfied, the voice communication frequency of the subject station voice band is sometimes changed to the QSY frequency, and this problem should be solved.

A first aspect of the embodiments provides a radio communication device including: a determiner configured to determine that a voice communication frequency of a voice band to be used by a subject station for a voice communication with a distant station is permitted to be changed to a voice communication frequency of a selected distant station, the voice communication frequency of the selected distant station being included in predetermined information disclosed by the selected distant station, when the predetermined information satisfies a predetermined condition set in the subject station, and that the voice communication frequency of the voice band is not permitted to be changed to the voice communication frequency of the selected distant station when the predetermined information does not satisfy the predetermined condition; and a frequency change controller configured, when an instruction to change the voice communication frequency to the voice communication frequency of the selected distant station is issued, to perform a control to change the voice communication frequency if the determiner determines that the voice communication frequency is permitted to be changed, and to perform a control to maintain the voice communication frequency without changing the voice communication frequency if the determiner determines that the voice communication frequency is not permitted to be changed.

A second aspect of the embodiments provides a method for controlling a radio communication device, the method including: changing a communication condition of a voice band to be used by a subject station for a voice communication with a distance station so that the communication condition corresponds to information necessary for communication, the information being included in predetermined information disclosed by a selected distant station, when the predetermined information satisfies a predetermined condition set in the subject station; and not changing the communication condition so that the communication condition corresponds to the information necessary for the communication, when the predetermined information does not satisfy the predetermined condition.

BRIEF DESCRIPTION OF THE DRAWINGS

FIG. 5A is a partial flowchart showing determination processing as to whether or not the voice communication frequency is changeable, the determination processing being performed by the radio communication device according to the embodiment and the method for controlling the radio communication device according to the embodiment.

FIG. 5B is a partial flowchart subsequent to FIG. 5A, showing the determination processing as to whether or not the voice communication frequency is changeable, the determination processing being performed by the radio communication device according to the embodiment and the method for controlling the radio communication device according to the embodiment.

FIG. 10 is a flowchart showing specific processing of step S14 shown in FIG. 5B.

FIG. 11 is a flowchart showing specific processing of step S17 shown in FIG. 5B.

DETAILED DESCRIPTION

A description is made below of a radio communication device according to the embodiment and the method for controlling the radio communication device according to the embodiment with reference to the accompanying drawings.

Figure 1:
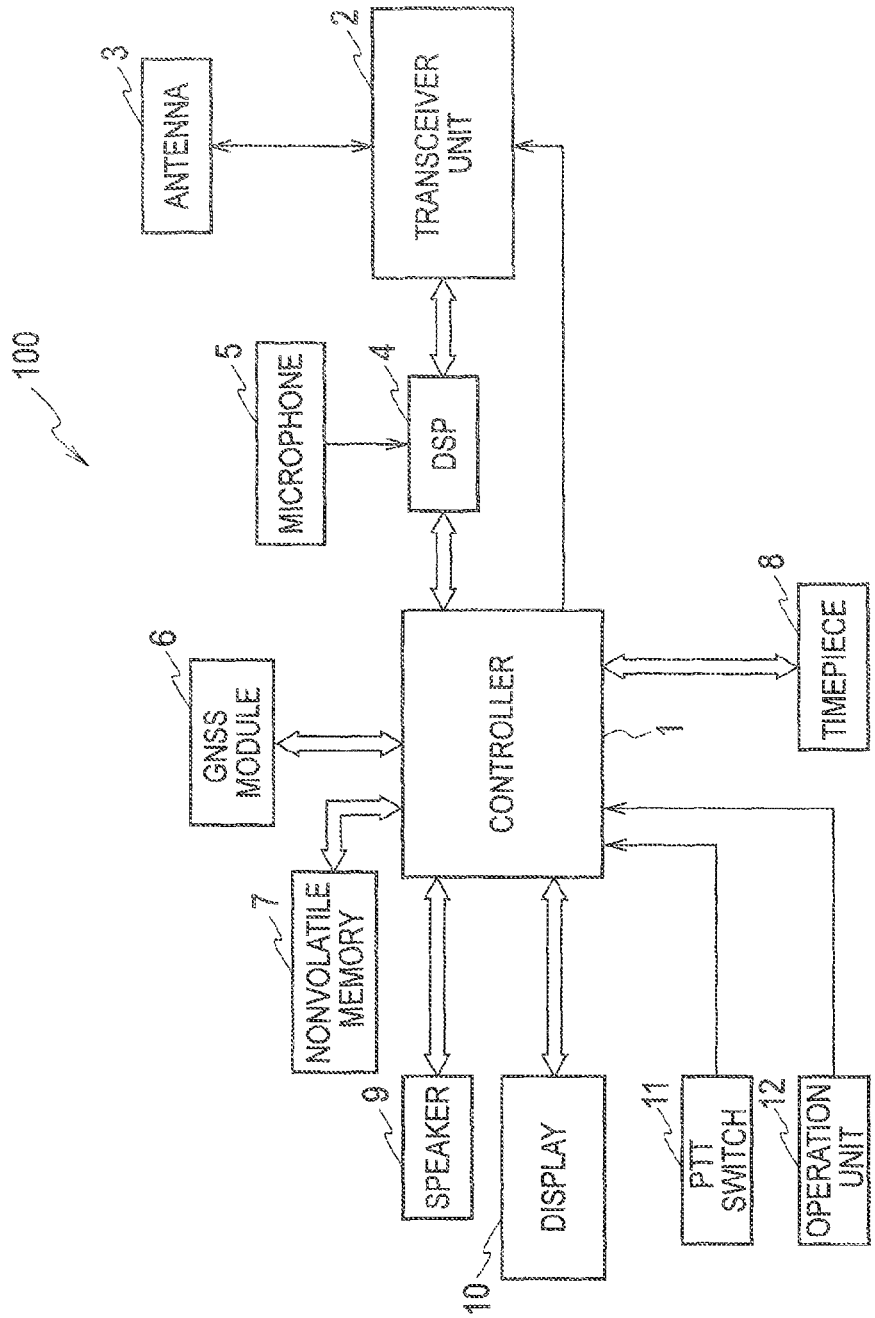
FIG. 1 is a block diagram showing an entire configuration of a radio communication device according to at least one embodiment.

First, by using FIG. 1, a description is made of an entire configuration and operation of a radio communication device 100 according to the embodiment.

In FIG. 1, a controller 1 controls the entirety of the radio communication device 100. The controller 1 can be composed of a microcomputer or a CPU. A DSP (Digital Signal Processor) 4 is connected to the controller 1. A transceiver unit 2 is connected to the DSP 4. An antenna 3 for transmitting or receiving a radio wave is connected to the transceiver unit 2.

The transceiver unit 2 is a circuit block in which a transmission unit and a reception unit are configured integrally with one another. The transmission unit and the reception unit may be configured separately from one another.

The transceiver unit 2 transmits or receives APRS data between a subject radio communication device 100 (subject station) and another radio communication device (distant station) by a half-duplex communication method. In the APRS, the frequency (data band) in an event of transmitting or receiving data and the frequency (voice band) in an event of transmitting or receiving a voice signal are different from one another.

The APRS data received by the transceiver unit 2 is supplied to the DSP 4. In the case where a bit rate is 1200 bps, the DSP 4 implements an AFSK demodulation for the received data and in the case where the bit rate is 9600 bps, the DSP 4 implements a GMSK demodulation for the received data. The DSP 4 supplies the demodulated data to the controller 1.

The controller 1 can perform APRS analysis processing, and as will be described later, can display a station list, which includes a QSY frequency, on a display 10. An example of the displayed QSY frequency is the distant station voice communication frequency.

In the case where the transceiver unit 2 receives a modulated wave of an audio signal, the transceiver unit 2 demodulates the received signal. If the demodulated audio signal includes signaling data, then the DSP 4 demodulates the data, supplies the demodulated data to the controller 1, performs bandwidth shaping and D/A conversion for the audio signal, and supplies an analog audio signal to the controller 1.

A microphone 5 is connected to the DSP 4. The microphone 5 picks up a voice emitted by a user of the radio communication device 100, converts the voice into an audio signal, and supplies the audio signal to the DSP 4. The DSP 4 performs A/D conversion for the inputted audio signal, performs bandwidth shaping and signaling processing, and turns the audio signal to a modulated wave.

The transceiver unit 2 modulates a carrier wave by the modulated wave supplied from the DSP 4, forms an FM-modulated signal, and transmits the FM-modulated signal via the antenna 3.

A GNSS module 6, a nonvolatile memory 7, a timepiece 8, a speaker 9, the display 10, a PTT (Push To Talk) switch 11, and an operation unit 12, are connected to the controller 1.

The GNSS module 6 includes: an antenna that receives a radio wave from a satellite for the Global Navigation Satellite System (GNSS); and a reception unit that receives a GNSS signal to be outputted by the antenna. The GNSS is a GPS (Global Positioning System) as an example.

The GNSS module 6 acquires the position information of the radio communication device 100, and supplies the acquired position information to the controller 1. The GNSS module 6 is a position information acquisition unit that acquires position information for the subject station.

The nonvolatile memory 7 stores a variety of setting states in the radio communication device 100. The nonvolatile memory 7 stores the distant station information, which is received by an APRS data communication. The nonvolatile memory 7 is, for example, an EEPROM (Electrically Erasable Programmable Read Only Memory).

The timepiece 8 is an RTC (Real Time Clock) as an example. Time information by the timepiece 8 is used as a time stamp.

The controller 1 supplies the analog audio signal, which is supplied from the DSP 4, to the speaker 9. The speaker 9 performs electroacoustic conversion for the inputted audio signal, and emits sound.

The controller 1 can allow the display 10 to display a variety of information. For example, the controller 1 allows the display 10 to display a menu and the station list, which will be described later.

When the user speaks and transmits an audio signal, the user pushes a PTT switch 11. In a PTT-OFF state where the PTT switch 11 is not pushed, the PTT switch 11 supplies a HIGH voltage to the controller 1. In a PTT-ON state where the PTT switch 11 is pushed, the PTT switch 11 supplies a LOW voltage to the controller 1.

The controller 1 can determine the PTT-ON state and the PTT-OFF state by distinguishing LOW or HIGH voltage supplied from the PTT switch 11.

The operation unit 12 includes a variety of operation keys. The user operates the operation keys, and can thereby move a cursor displayed on the display 10, and can select a specific item.

In FIG. 1, blank arrows indicate a bus that connects the constituent elements to one another. There may be a case of using a usual signal connection line in place of the bus.

Figure 2:
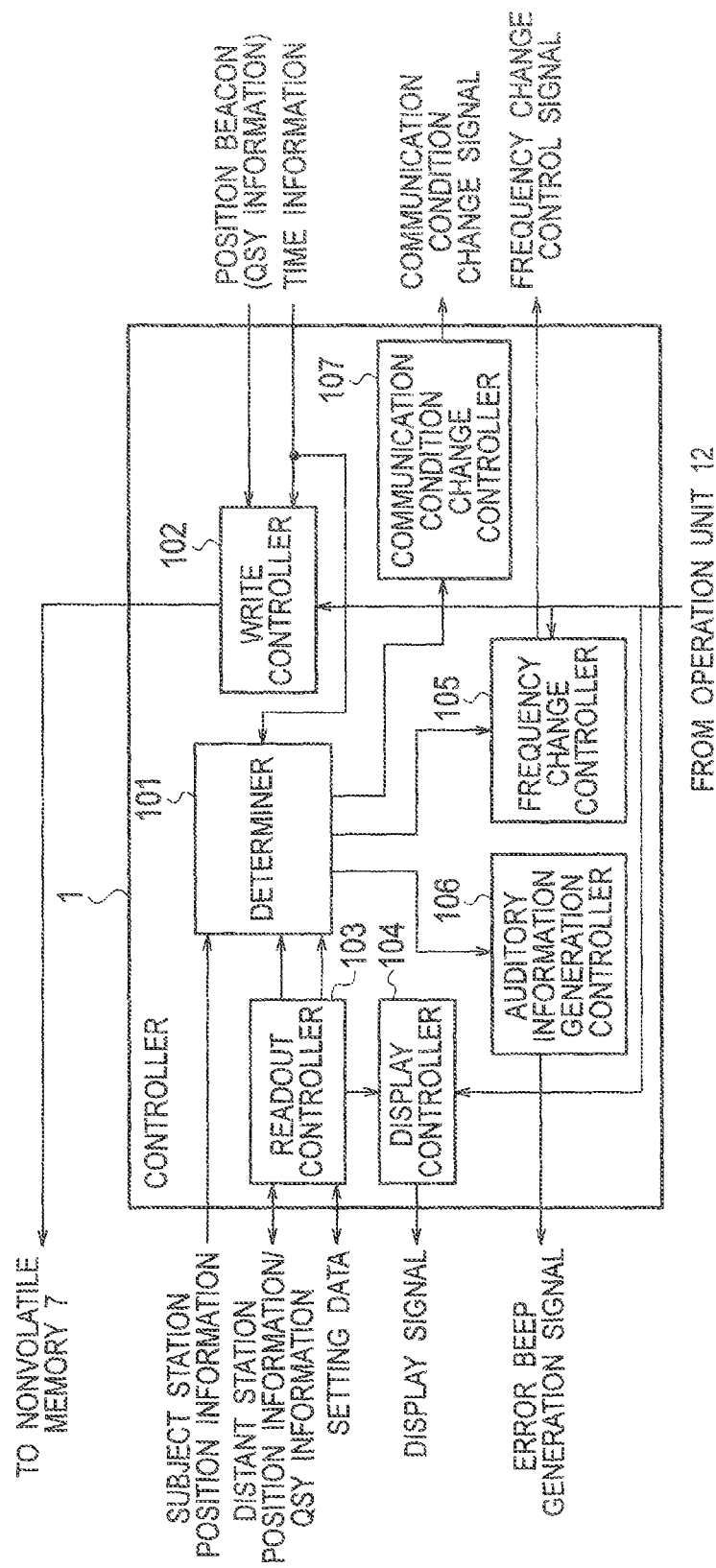
FIG. 2 is a block diagram showing a specific internal configuration example of a controller 1 shown in FIG. 1.

As shown in FIG. 2, the controller 1 includes, as functional internal configurations: a determiner 101; a write controller 102; a readout controller 103; a display controller 104; a frequency change controller 105; an auditory information generation controller 106; and a communication condition change controller 107. These can be composed of software (a computer program).

The computer program is stored in a predetermined memory. The CPU executes the computer program, whereby the CPU can operate as the controller 1 having the respective parts shown in FIG. 2.

To the write controller 102, a position beacon for the distant station, which is received by the APRS data communication, and the time information coming from the timepiece 8 are inputted. Since QSY information is included in the position beacon, the write controller 102 can write information regarding the distant station, such as the position information of the distant station and the QSY information, that is, information disclosed by the distant station, into the nonvolatile memory 7.

The write controller 102 can write a reception time into the nonvolatile memory 7 based on the time information.

The readout controller 103 reads necessary information regarding the distant station from the nonvolatile memory 7, and supplies the readout necessary information to the determiner 101. The subject station position information, which comes from the GNSS module 6, is inputted to the determiner 101. The determiner 101 executes determination processing shown in FIG. 5A and FIG. 5B.

The display controller 104 supplies a display signal to the display 10 based on the necessity regarding the distant station, which is read from the nonvolatile memory 7 by the readout controller 103.

In the case of changing the voice communication frequency of the subject station to the QSY frequency, the frequency change controller 105 supplies a frequency change control signal to the transceiver unit 2 in accordance with a determination result by the determiner 101. In the case of not changing the voice communication frequency of the subject station to the QSY frequency, the auditory information generation controller 106 supplies an error beep generation signal to the speaker 9 in accordance with the determination result by the determiner 101.

In accordance with the determination result by the determiner 101, the communication condition change controller 107 supplies the DSP 4 with a communication control change signal that changes the subject station communication conditions to information necessary for the communication with the distant station.

Figure 3:
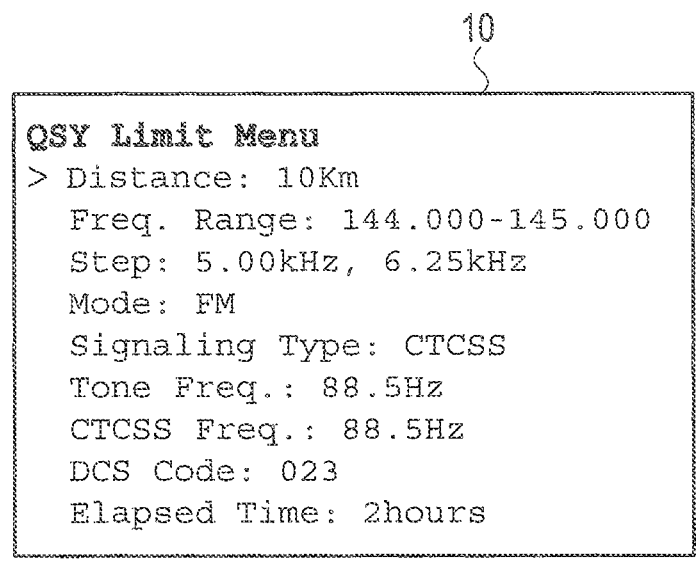
FIG. 3 is a view showing an example of a QSY function limit menu preset by the radio communication device according to the embodiment and a method for controlling the radio communication device according to the embodiment.

In the embodiment, the radio communication device 100 is configured to preset limitation conditions in an event of implementing the QSY function. When an operation to display a QSY function limit menu on the display 10 by the operation unit 12 is performed, the display 10 displays a QSY function limit menu as shown in FIG. 3.

"Distance" in the QSY function limit menu indicates that the QSY function is implemented when the distance between the subject station and the distant station is equal to or shorter than the set distance. In an example shown in FIG. 3, the distance is set at 10 km. "Freq. Range" indicates that the QSY function is implemented when the range of a reception frequency is within the set frequency range. In the example shown in FIG. 3, the frequency range is set from 144.000 to 145.000 MHz.

"Step" indicates that the QSY function is implemented when a frequency step of the reception frequency is the set frequency step. In the example shown in FIG. 3, the frequency step is set at 5.00 kHz and 6.25 kHz. The frequency step is set for making a communication at a convenient and definite communication frequency. Although the frequency step is sometimes determined customarily, the frequency step is determined in accordance with operation rules or regulations pursuant thereto in many countries.

"Mode" indicates that the QSY function is implemented when the distant station communication mode is the set communication mode. For example, the communication mode is a type of a communication mode, such as FM wide, FM narrow and AM. In the example shown in FIG. 3, the communication mode is set to FM. The FM is a communication mode including both of the FM wide and the FM narrow.

"Signaling Type" indicates that the QSY function is implemented when a signaling type of a signaling added to a received signal from the distant station is the set signaling type. In the example shown in FIG. 3, the signaling type is set at CTCSS.

The signaling type is any of "OFF" that turns off a condition of the signaling type, and "Signaling OFF", "TONE", "CTCSS", "DCS", "TONE+CTCSS", "TONE+DCS", "CTCSS+DCS" and "TONE+CTCSS+DCS", each of which does not specify the signaling type.

"TONE+CTCSS" indicates that the signaling type may be either "TONE" or "CTCSS" "TONE+DCS" indicates that the signaling type may be either "TONE" or "DCS". "CTCSS+DCS" indicates that the signaling type may be either "CTCSS" or "DCS" "TONE+CTCSS+DCS" indicates that the signaling type may be any of "TONE" "CTCSS" and "DCS".

"Tone Freq." indicates that the QSY function is implemented when a tone frequency is the set tone frequency. In the example shown in FIG. 3, the tone frequency is set at 88.5 Hz. "CTCSS Freq." indicates that the QSY function is implemented when a CTCSS frequency is the set CTCSS frequency. In the example shown in FIG. 3, the CTCSS frequency is set at 88.5 Hz.

"DCS Code" indicates that the QSY function is implemented when a DCS code is the set DCS code. In the example shown in FIG. 3, the DCS code is set at 023. Information including this DCS Code, the signaling type and the tone frequency is referred to as signaling information disclosed by the distant station, and in a similar way, information including this DCS Code, and the signaling type and the tone frequency in the subject station QSY function limit menu is referred to as a signaling condition.

"Elapsed Time" indicates that the QSY function is implemented when the elapsed time of reception from when data is received from the distant station is equal to or shorter than the set time. In the example shown in FIG. 3, the elapsed time of reception is set at two hours.

When the user operates the operation unit 12 and sets the QSY function limit menu as shown in FIG. 3, then such a setting is written into the nonvolatile memory 7 by the write controller 102 shown in FIG. 2.

Figure 4:
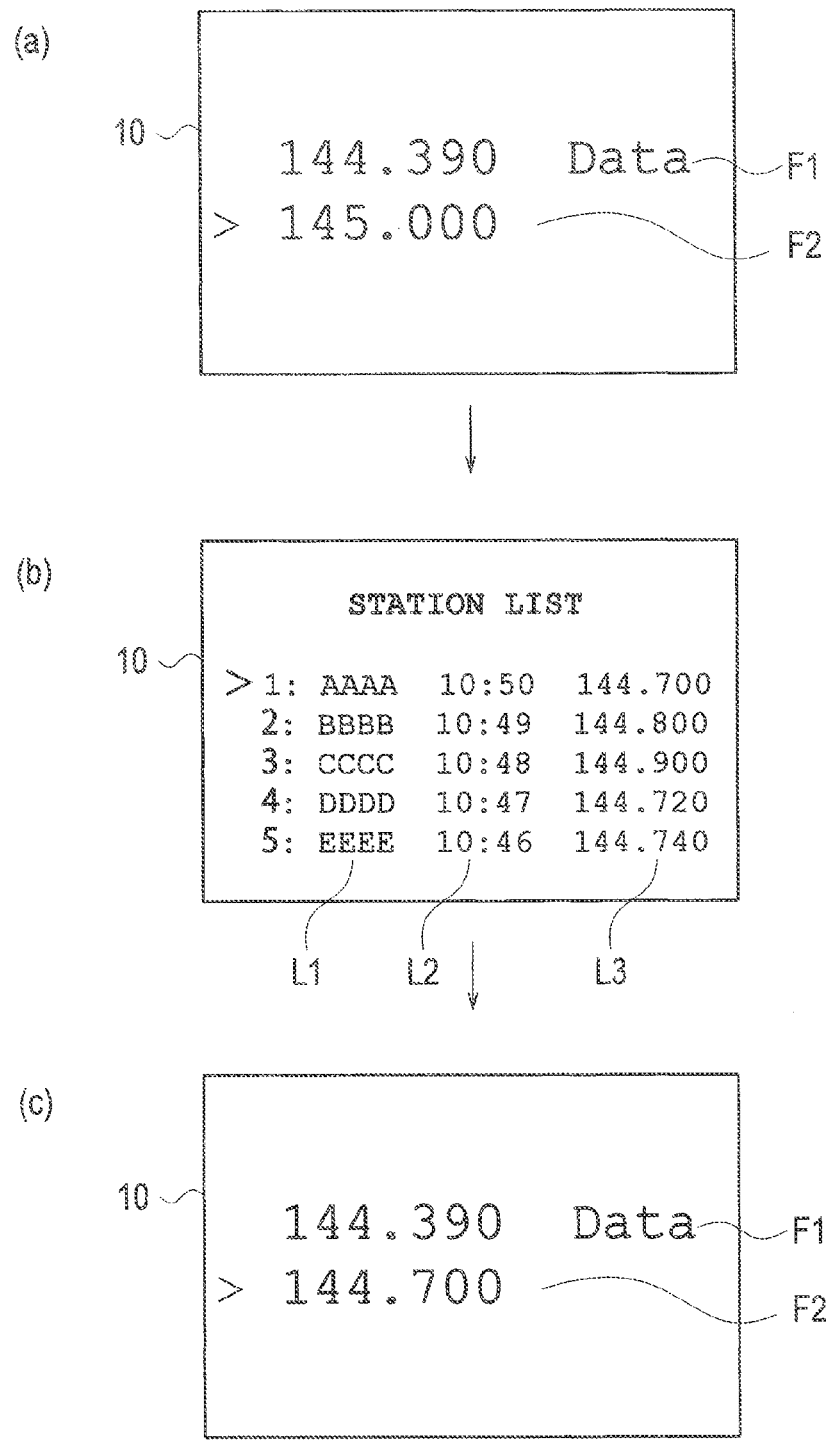
FIG. 4 is a view showing an example of transition of a display state of a display in an event of changing the voice communication frequency of a voice band to a QSY frequency.

In FIG. 4, (a) shows an example of a state of reception in the radio communication device 100 at a certain point in time. On the display 10, a data band F1 and a voice band F2 are displayed. The data band F1 is set at 144.390 MHz, and the voice band F2 is set at 145.000 MHz.

The user can allow the display 10 to display the station list by operating the operation unit 12. In FIG. 4, (b) shows an example of the station list. In response to the operation by the operation unit 12, the controller 1 switches the display state of the display 10 from the state shown in (a) of FIG. 4 to the display state showing the station list, which is shown in (b) of FIG. 4.

As shown in (b) of FIG. 4, the station list includes: information L1 indicating distant station call signs; information L2 indicating the reception time; and information L3 indicating the QSY frequencies. The information L2 may be information indicating a reception date and time.

The display controller 104 supplies the display signal to the display 10, whereby such visual information as in (a), (b), and (c) to be described later can be displayed thereon.

In (b) of FIG. 4, the cursor indicates reception information of the distant station call sign named AAAA denoted by reference numeral 1. For example, it is supposed that the user selects the reception information of reference numeral 1 and attempts to change the voice communication frequency of the voice band to 144.700 as the QSY frequency. Then, an instruction signal from the operation unit 12, which is to change the voice communication frequency to the QSY frequency, is inputted to the frequency change controller 105.

The controller 1 (frequency change controller 105) changes the voice communication frequency in accordance with the flowchart shown in FIG. 5A and FIG. 5B when the information disclosed by the distant station satisfies the limitation conditions preset as shown in FIG. 3, and does not change the voice communication frequency when the information does not satisfy any of the limitation conditions.

Moreover, in the case where information, which is other than the voice communication frequency, is necessary for the communication, and has communication conditions in other words, the information including the mode and the signaling, is set, and the communication conditions are satisfied, then the controller 1 also changes the subject station communication conditions. That is, the controller 1 compares the information, which is disclosed by the selected distant station, and the conditions set by the subject station with one another and determines whether or not it is possible to communicate with the selected distant station.

Then, if it is possible to communicate with the selected distant station, the controller 1 performs a control to set the subject station to a state of being capable of communicating with the distant station, and if it is impossible to communicate, then the controller 1 does not perform the control to set the subject station to the state of being capable of communication with the distant station.

When any of the limitation conditions is not satisfied, the controller 1 (auditory information generation controller 106) causes the speaker to emit an error beep as an example of auditory information issuing a notice that the voice communication frequency is not changed to the QSY frequency.

By using FIG. 6 to FIG. 11 in combination with FIG. 5A and FIG. 5B, a description is made of specific processing for deciding whether the voice communication frequency is to be changed or the error beep is to be emitted.

When the user issues an instruction to change the voice communication frequency to the QSY frequency denoted by reference numeral 1 in the station list, then in step S1, the controller 1 (determiner 101) determines whether or not a reception elapsed time condition is set. The controller 1 shifts the processing to step S2 if the reception elapsed time condition is set, and shifts the processing to step S4 if the reception elapsed time condition is not set.

Figure 6:
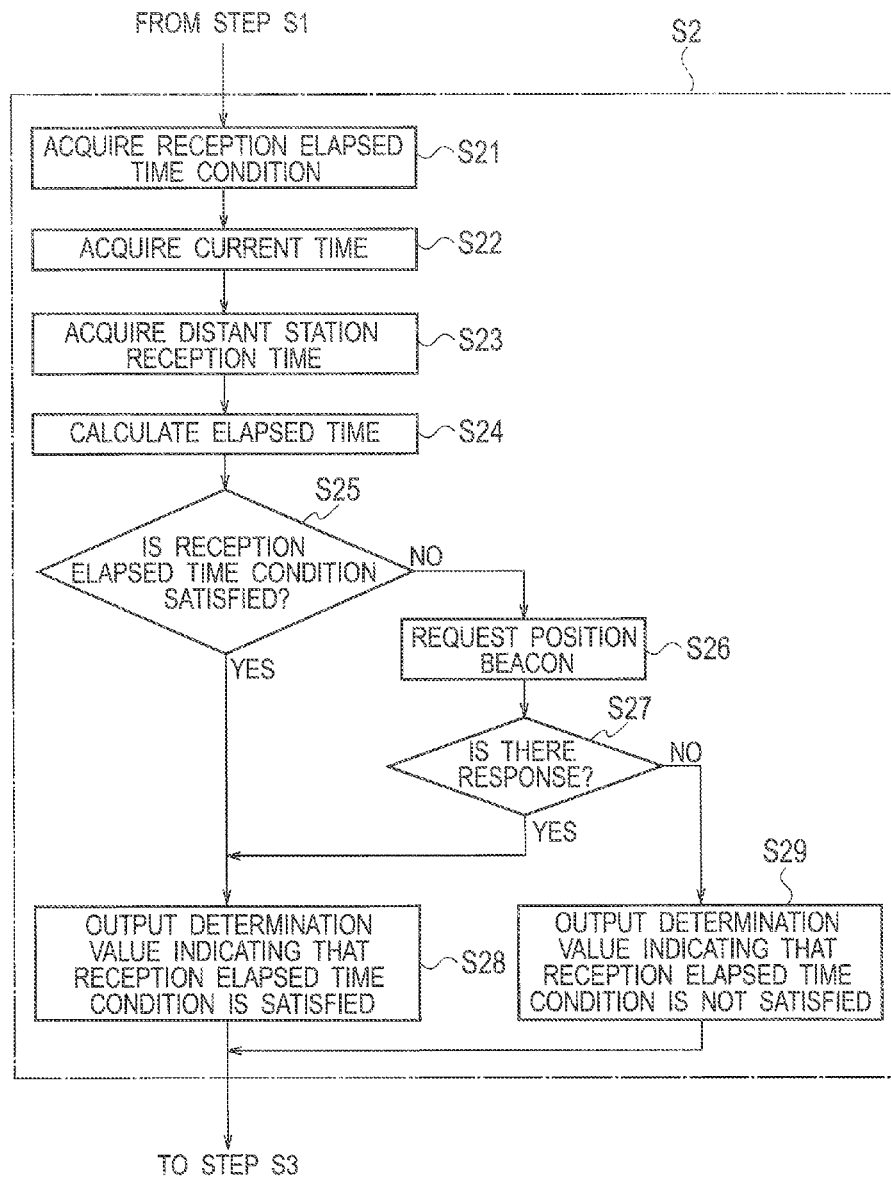
FIG. 6 is a flowchart showing specific processing of step S2 shown in FIG. 5A.

In step S2, the controller 1 confirms the reception elapsed time. FIG. 6 shows specific processing of step S2. In FIG. 6, the controller 1 acquires the reception elapsed time condition in step S21. The controller 1 acquires a current time from the timepiece 8 in step S22, and acquires the reception time of the distant station from the information L2 in step S23. In step S24, the controller 1 subtracts the reception time from the current time, and calculates the elapsed time.

In step S25, the controller 1 determines whether the elapsed time satisfies the reception elapsed time condition. The controller 1 shifts the processing to step S26 if the reception elapsed time condition is not satisfied (NO), that is, if the elapsed ti-e exceeds two hours. The controller 1 shifts the processing to step S28 if the reception elapsed time condition is satisfied (YES), that is, if the elapsed time is two hours or less.

The controller 1 transmits a position beacon request to the distant station in step S26, and determines whether or not there is a reply in step S27. The controller 1 shifts the processing to step S28 if there is a reply (YES), and shifts the processing to step S29 if there is no reply (NO).

The controller 1 outputs a determination value (for example, "1") indicating that the reception elapsed time condition is satisfied in step S28, and outputs a determination value (for example "0") indicating that the reception elapsed time condition is not satisfied in step S29.

In FIG. 6, even in a case where it is determined once in step S25 that the reception elapsed time condition is not satisfied, steps S26 and S27 are set, whereby it is determined that the reception elapsed time condition is satisfied if there is a reply to the position beacon request. In such a way, if the distant station is still in such a communicable state, then the change of the voice communication frequency to the QSY frequency can be permitted.

Steps S26 and S27 may be omitted and the processing may be shifted to step S29 if it is determined in step S25 that the reception elapsed time condition is not satisfied.

Returning back to FIG. 5A, in step S3, the controller 1 determines whether or not the reception elapsed time condition is satisfied based on the determination value coming from step S2. If the reception elapsed time condition is satisfied (if the determination value is "1") (YES), then the controller 1 shifts the processing to step S4. If the reception elapsed time condition is not satisfied (if the determination value is "0") (NO), then the controller 1 shifts the processing to step S20.

In step S4, the controller 1 determines whether or not a distance condition is set. The controller 1 shifts the processing to step S5 if the distance condition is set, and shifts the processing to step S7 if the distance condition is not set.

Figure 7:
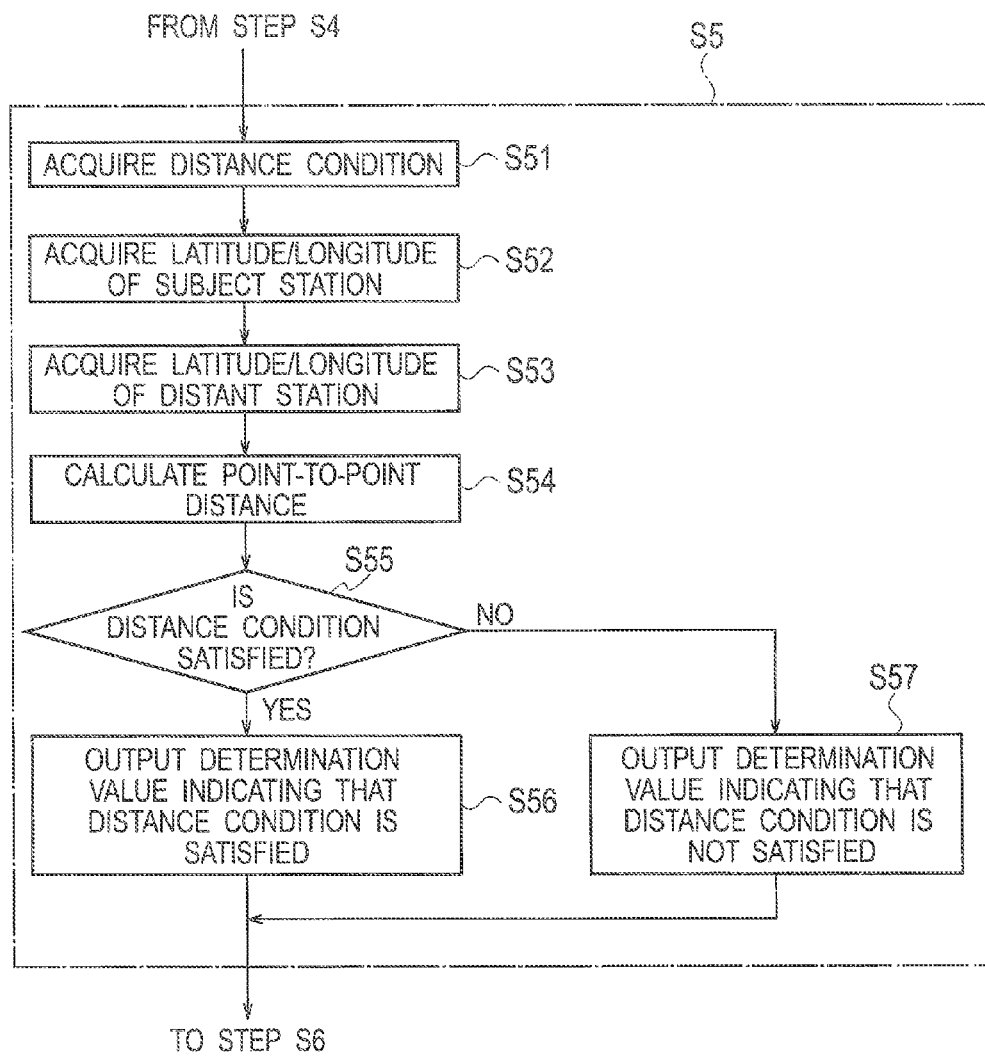
FIG. 7 is a flowchart showing specific processing of step S5 shown in FIG. 5A.

In step S5, the controller 1 confirms the distance to the distant station. FIG. 7 shows specific processing of step S5. In FIG. 7, the controller 1 acquires the distance condition in step S51. In step S52, the controller 1 acquires the latitude/longitude coordinates of the subject station. In step S53, the controller 1 acquires latitude/longitude coordinates of the distant station based on the position beacon coming from the distant station.

In step S54, the controller 1 calculates a point-to-point distance between the subject station and the distant station. In step S55, the controller 1 determines whether or not the point-to-point distance satisfies the distance condition.

The controller 1 shifts the processing to step S56 if the distance condition is satisfied (YES), that is, if the distance is equal to or shorter than 10 km. The controller 1 shifts the processing to step S57 if the distance condition is not satisfied (NO), that is, if the distance exceeds 10 km.

The controller 1 outputs a determination value (for example, "1") indicating that the distance condition is satisfied in step S56, and outputs a determination value (for example "0") indicating that the distance condition is not satisfied in step S57.

Returning back to FIG. 5A, in step S6, the controller 1 determines whether or not the distance condition is satisfied based on the determination value coming from step S5. If the distance condition is satisfied (if the determination value is "1") (YES), then the controller 1 shifts the processing to step S7. If the distance condition is not satisfied (if the determination value is "0") (NO), then the controller 1 shifts the processing to step S20.

In step S7, the controller 1 determines whether or not a frequency range condition is set. The controller 1 shifts the processing to step S8 if the frequency range condition is set, and shifts the processing to step S10 if the frequency range condition is not set.

Figure 8:
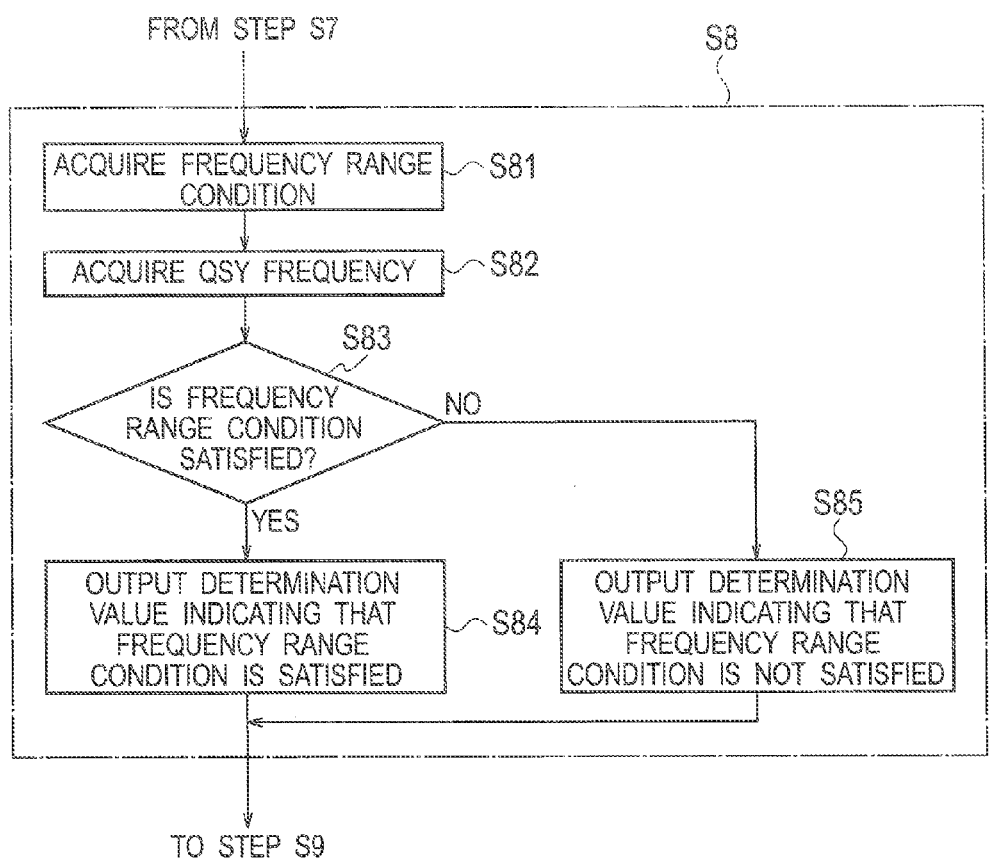
FIG. 8 is a flowchart showing specific processing of step S88 shown in FIG. 5A.

In step S8, the controller 1 confirms the frequency range condition. FIG. 8 shows specific processing of step S8. In FIG. 8, the controller 1 acquires the frequency range condition in step S81. In step S82, the controller 1 acquires a QSY frequency. In step S83, the controller 1 determines whether or not the QSY frequency satisfies the frequency range condition.

The controller 1 shifts the processing to step S84 if the QSY frequency satisfies the frequency range condition (YES), that is, if the QSY frequency is included in the range of 144.000 to 145.000 MHz. The controller 1 shifts the processing to step S85 if the QSY frequency does not satisfy the frequency range condition (NO), that is, if the QSY frequency is not included in the range of 144.000 to 145.000 MHz.

The controller 1 outputs a determination value (for example, "1") indicating that the frequency range condition is satisfied in step S84, and outputs a determination value (for example "0") indicating that the frequency range condition is not satisfied in step S85.

Returning back to FIG. 5A, in step S9, the controller 1 determines whether or not the frequency range condition is satisfied based on the determination value coming from step S8. If the frequency range condition is satisfied (if the determination value is "1") (YES), then the controller 1 shifts the processing to step S10. If the frequency range condition is not satisfied (if the determination value is "0") (NO), then the controller 1 shifts the processing to step S20.

In FIG. 5B, in step S10, the controller 1 determines whether or not a step frequency condition is set. The controller 1 shifts the processing to step S11 if the step frequency condition is set, and shifts the processing to step S13 if the step frequency condition is not set.

Figure 9:
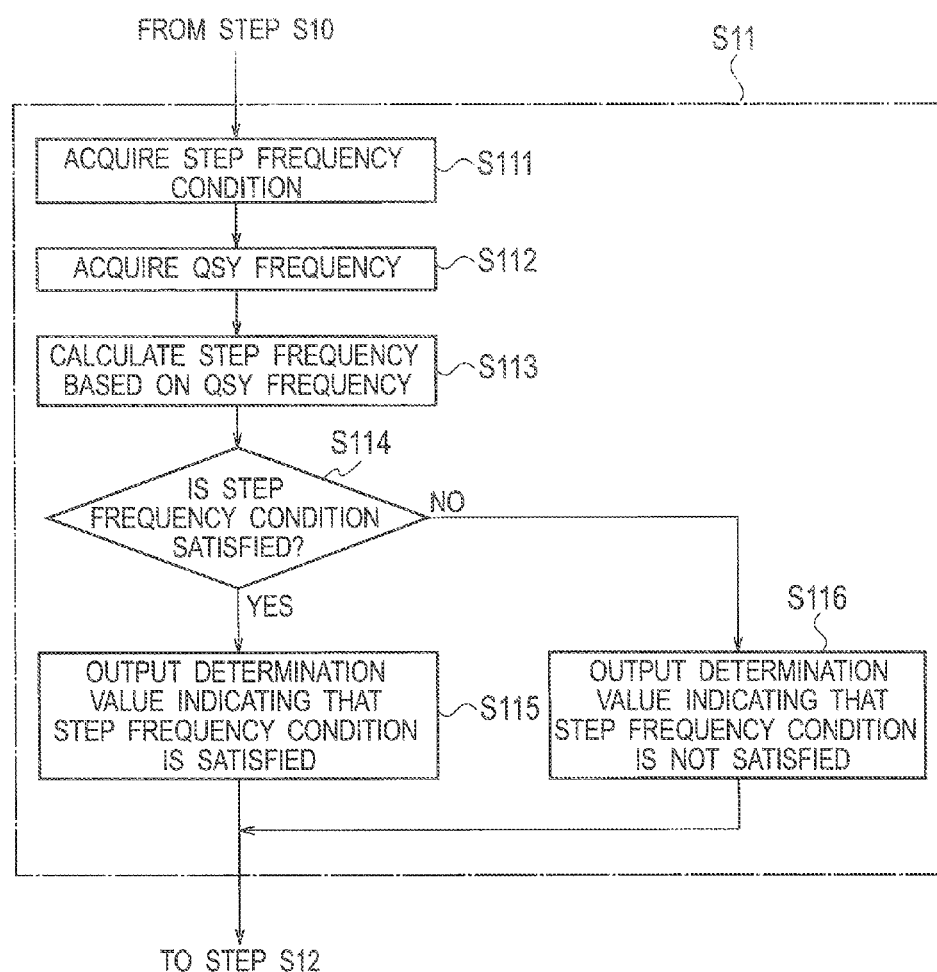
FIG. 9 is a flowchart showing specific processing of step S11 shown in FIG. 5B.

In step S11, the controller 1 confirms the step frequency condition. FIG. 9 shows specific processing of step S11. In FIG. 9, the controller 1 acquires the step frequency condition in step S111. In step S112, the controller 1 acquires the QSY frequency. In step S113, the controller 1 calculates a step frequency based on the QSY frequency.

In step S114, the controller 1 determines whether or not the step frequency calculated in step S113 satisfies the step frequency condition.

The controller 1 shifts the processing to step S115 if the step frequency satisfies the step frequency condition (YES) that is, if the step frequency is 5.00 Hz or 6.25 Hz. The controller 1 shifts the processing to step S116 if the step frequency does not satisfy the step frequency condition (NO), that is, if the step frequency is neither 5.00 Hz nor 6.25 Hz.

The controller 1 outputs a determination value (for example, "1") indicating that the step frequency condition is satisfied in step S115, and outputs a determination value (for example "0") indicating that the step frequency condition is not satisfied in step S116.

Returning back to FIG. 5B, in step S12, the controller 1 determines whether or not the step frequency condition is satisfied based on the determination value coming from step S11. If the step frequency condition is satisfied (if the determination value is "1") (YES), then the controller 1 shifts the processing to step S13. If the step frequency condition is not satisfied (if the determination value is "0") (NO), then the controller 1 shifts the processing to step S20.

In step S13, the controller 1 determines whether or not a communication mode condition is set. The controller 1 shifts the processing to step S14 if the communication mode condition is set, and shifts the processing to step S16 if the communication mode condition is not set.

In step S14, the controller 1 confirms the communication mode. FIG. 10 shows specific processing of step S14. In FIG. 9, the controller 1 acquires the communication mode condition in step S141. In step S142, the controller 1 acquires communication mode information. In step S143, the controller 1 determines whether or not the communication mode information acquired in step S142 satisfies the communication mode condition.

The controller 1 shifts the processing to step 3144 if the communication mode condition is satisfied (YES), that is, if the communication mode information is FM. The controller 1 shifts the processing to step S145 if the communication mode condition is not satisfied (NO), that is, if the communication mode information is not FM.

The controller 1 outputs a determination value (for example, "1") indicating that the communication mode condition is satisfied in step S144, and outputs a determination value (for example "0") indicating that the communication mode condition is not satisfied in step S3145.

Returning back to FIG. 5B, in step S15, the controller 1 determines whether or not the communication mode condition is satisfied based on the determination value coming from step S14. If the communication mode condition is satisfied (if the determination value is "1") (YES), then the controller 1 shifts the processing to step 316. If the communication mode condition is not satisfied (if the determination value is "0") (NO), then the controller 1 shifts the processing to step S20.

In step S16, the controller 1 determines whether or not the signaling condition is set. The controller 1 shifts the processing to step S17 if the signaling condition is set, and shifts the processing to step S19 if the signaling condition is not set.

In step S17, the controller 1 confirms the signaling information. FIG. 11 shows specific processing of step S17. In FIG. 11, the controller 1 acquires the signaling condition in step S171. In step S172, the controller 1 determines the signaling condition set by the QSY function limit menu.

If the signaling condition is set at "TONE", then the controller 1 acquires the TONE frequency set in the QSY function limit menu in step S173. If the signaling condition is set at "CTCSS", then the controller 1 acquires the CTCSS frequency set by the QSY function limit menu in step S174.

If the signaling condition is set at "DCS,", then the controller 1i acquires the DCS code set by the QSY function limit menu in step S175.

In step S176, the controller 1 acquires the signaling information included in the QSY information. In step S177, the controller 1 determines whether or not the signaling information acquired in step S176 satisfies the signaling condition.

If the signaling condition included in the information disclosed by the distant station and the signaling information set by the QSY function limit menu coincide with one another, then the signaling condition is satisfied, if the signaling information and the signaling condition set by the QSY function limit menu do not coincide with one another, then the signaling condition is not satisfied.

The controller 1 shifts the processing to step S178 if the signaling condition is satisfied (YES), and shifts the processing to step S179 if the signaling condition is not satisfied (NO).

The controller 1 outputs a determination value (for example, "1") indicating that the signaling condition is satisfied in step S178, and outputs a determination value (for example "0") indicating that the signaling condition is not satisfied in step S179.

As described above, when all of the conditions in steps S3, S6 S9, S12, S15 and S18 are satisfied, the controller 1 determines that the voice communication frequency can be changed to the QSY frequency, and shifts the processing to step S19.

In step S19, the controller 1 (frequency change controller 105) changes the voice communication frequency to 144.700 MHz as the QSY frequency selected in (b) of FIG. 4, and ends the processing.

Moreover, in the case where the communication mode condition of step S13 and the signaling condition of step S16 are satisfied, the controller 1 (communication condition change controller 107) changes the voice communication frequency to a setting capable of communication at the QSY frequency, and ends the processing.

As shown in (c) of FIG. 4, the voice communication frequency of the voice band F2 is changed to 144.700 MHz.

On the other hand, if any condition in steps S3, S6, S9, S12, 315 or S18 is not satisfied, the controller 1 determines that the voice communication frequency cannot be changed to the QSY frequency, and shifts the processing to step S20.

The controller 1 (frequency change controller 105) maintains the voice communication frequency without changing the voice communication frequency to the QSY frequency. In step S20, the controller 1 (auditory information generation controller 106) causes the error beep to be emitted from the speaker 9, and ends the processing.

In addition to that the controller 1 causes the error beep to be emitted from the speaker 9, the controller 1 may display visual information indicating that the voice communication frequency cannot be changed to the QSY frequency on the display 10. The controller 1 may display visual information indicating that the voice communication frequency cannot be changed to the QSY frequency on the display 10 without emitting the error beep from the speaker 9, however it is preferable to emit the error beep from the speaker 9.

In the embodiment, it is permitted to change the voice communication frequency to the QSY frequency when all of the conditions in steps S3, S6, S9, S12, S15 and S18 in FIG. 5A and FIG. 5B are satisfied; however, the embodiment is not limited to this.

It may be permitted to change the voice communication frequency to the QSY frequency when any one of the conditions is satisfied. The distance condition may be taken as an essential condition, and any other conditions may be combined arbitrarily with one another.

Moreover, in the case where the mode of the information disclosed by the distant station and the signaling information coincide with the conditions set by the subject station, not only the voice communication frequency of the subject station is changed to the QSY frequency disclosed by the distant station, but also the setting of the mode and the signaling may be changed.

As described above, regarding the radio communication device according to the embodiment, only in the case where a predetermined condition under which the voice can be transmitted or received is satisfied, the voice communication frequency of the voice band of the subject station can be changed to the voice communication frequency of the distant station. Regarding the method for controlling the radio communication device according to the embodiment, only in the case where the predetermined condition under which the voice can be transmitted or received is satisfied, the subject station band communication conditions can be changed.

The present invention is not limited to the embodiment described above, and is changeable in various ways within the scope without departing from the scope of the present invention. In an event of configuring the radio communication device according to the embodiment, the choice of hardware and software is arbitrary.

What is claimed is:

1. A radio communication device that is a subject station, comprising:
    a determiner configured to determine that a voice communication frequency of a voice band to be used by the subject station for a voice communication with a distant station is permitted to be changed to a voice communication frequency of a selected distant station, the voice communication frequency of the selected distant station being included in predetermined information disclosed by the selected distant station, when the predetermined information satisfies a predetermined condition set in the subject station, and that the voice communication frequency of the voice band is not permitted to be changed to the voice communication frequency of the selected distant station when the predetermined information does not satisfy the predetermined condition; and
    a frequency change controller configured, when an instruction to change the voice communication frequency to the voice communication frequency of the selected distant station is issued, to perform a control to change the voice communication frequency if the determiner determines that the voice communication frequency is permitted to be changed, and to perform a control to maintain the voice communication frequency without changing the voice communication frequency if the determiner determines that the voice communication frequency is not permitted to be changed,
    wherein the determiner determines that a communication condition is permitted to be set for the subject station, in a case where information relating to a communication condition other than the voice communication frequency included in the predetermined information of the selected distant station, satisfies a communication condition included in the predetermined condition, the communication condition being a communication mode, and
    the radio communication device further comprising a communication condition change controller configured to perform a control to change the communication condition when the determiner determines that the communication condition is permitted to be set.

2. The radio communication device according to claim 1, further comprising a position information acquisition unit configured to acquire position information of the subject station,
    wherein the predetermined information comprises position information of the distant station, and
    the determiner determines that the predetermined condition is satisfied when a distance between the subject station and the selected distant station is equal to or shorter than a distance set as the predetermined condition, and determines that the predetermined condition is not satisfied when the distance is not equal to or shorter than the selected distance set as the predetermined condition.

3. A radio communication device that is a subject station, comprising:
   a determiner configured to determine that a voice communication frequency of a voice band to be used by the subject station for a voice communication with a distant station is permitted to be changed to a voice communication frequency of a selected distant station, the voice communication frequency of the selected distant station being included in predetermined information disclosed by the selected distant station, when the predetermined information satisfies a predetermined condition set in the subject station, and that the voice communication frequency of the voice band is not permitted to be changed to the voice communication frequency of the selected distant station when the predetermined information does not satisfy the predetermined condition; and
   a frequency change controller configured, when an instruction to change the voice communication frequency to the voice communication frequency of the selected distant station is issued, to perform a control to change the voice communication frequency if the determiner determines that the voice communication frequency is permitted to be changed, and to perform a control to maintain the voice communication frequency without changing the voice communication frequency if the determiner determines that the voice communication frequency is not permitted to be changed,
   wherein the determiner determines that a communication condition is permitted to be set for the subject station, in a case where information relating to a communication condition other than the voice communication frequency included in the predetermined information of the selected distant station, satisfies a communication condition included in the predetermined condition, and
   the radio communication device further comprising a communication condition change controller configured to perform a control to change the communication condition when the determiner determines that the communication condition is permitted to be set.

4. The radio communication device according to claim 3, further comprising an auditory information generation controller configured to generate auditory information to issue a notice not to change the voice communication frequency, when the instruction to change the voice communication frequency to the voice communication frequency of the selected distant station is issued, and the determiner determines that the voice communication frequency is not permitted to be changed.

5. The radio communication device according to claim 3, the communication condition is a communication mode.

6. The radio communication device according to claim 5, wherein the communication mode is either FM or AM.

7. The radio communication device according to claim 3, the communication condition is signaling information.

8. The radio communication device according to claim 7, wherein the signaling information includes a signaling type of a signaling.

9. The radio communication device according to claim 8, wherein the signaling information further includes a tone frequency.

10. A method for controlling a radio communication device that is a subject station, the method comprising:
    determining that a voice communication frequency of a voice band to be used by the subject station for a voice communication with a distant station is permitted to be changed to a voice communication frequency of a selected distant station, the voice communication frequency of the selected distant station being included in predetermined information disclosed by the selected distant station, when the predetermined information satisfies a predetermined condition set in the subject station;
    determining that the voice communication frequency of the voice band is not permitted to be changed to the voice communication frequency of the selected distant station when the predetermined information does not satisfy the predetermined condition;
    performing a control to change the voice communication frequency if it is determined that the voice communication frequency is permitted to be changed, when an instruction to change the voice communication frequency to the voice communication frequency of the selected distant station is issued;
    performing a control to maintain the voice communication frequency without changing the voice communication frequency if it is determined that the voice communication frequency is not permitted to be changed, when an instruction to change the voice communication frequency to the voice communication frequency of the selected distant station is issued;
    determining that a communication condition is permitted to be set for the subject station, in a case where information relating to a communication condition other than the voice communication frequency included in the predetermined information of the selected distant station, satisfies a communication condition included in the predetermined condition; and
    performing a control to change the communication condition when it is determined that the communication condition is permitted to be set.

* * * * *